UNITED STATES PATENT OFFICE.

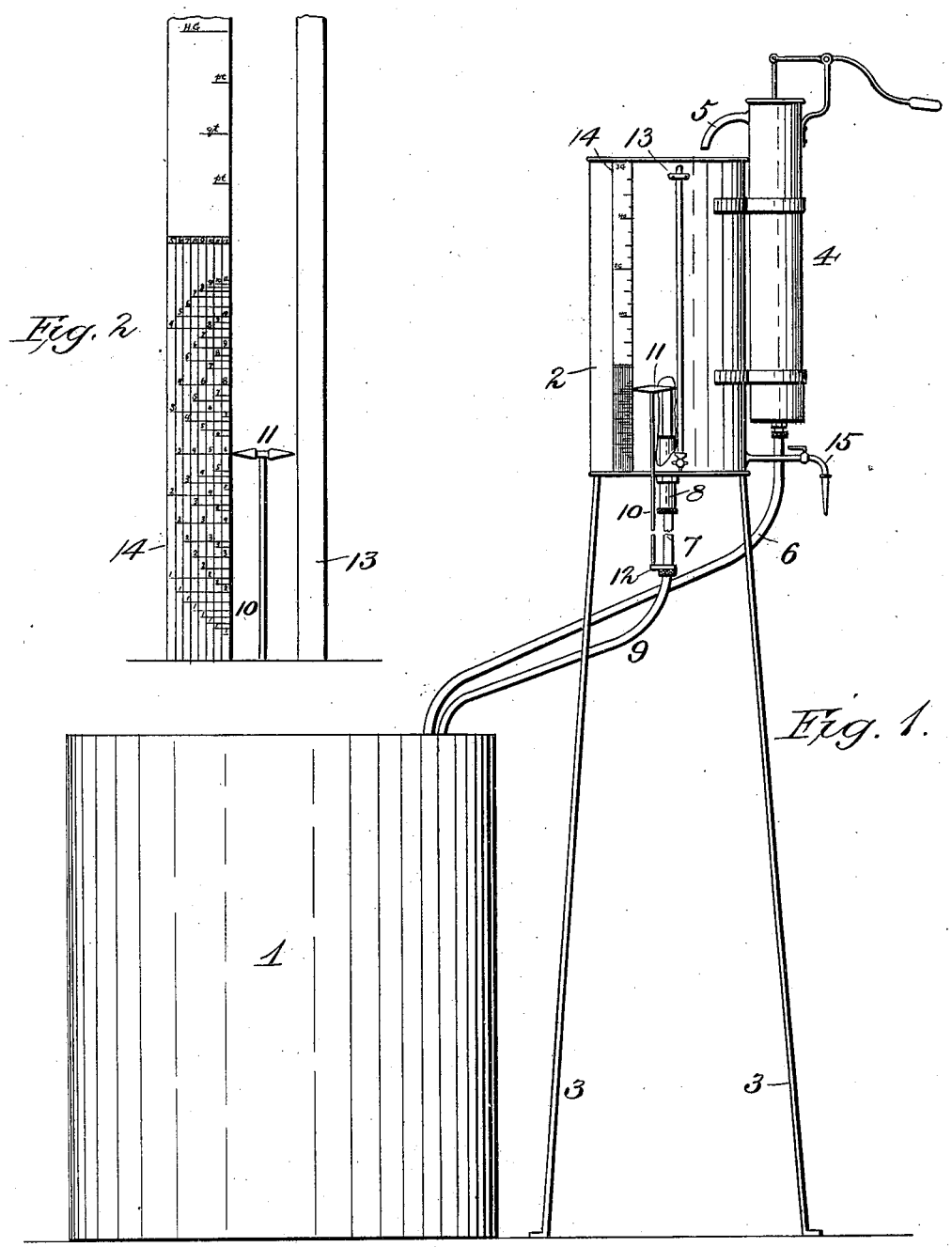

BENJAMIN F. D. MILLER, OF WOOSTER, OHIO, ASSIGNOR TO FRANK HERMAN, OF SAME PLACE.

OIL TANK AND PUMP.

SPECIFICATION forming part of Letters Patent No. 664,283, dated December 18, 1900.

Application filed August 21, 1900. Serial No. 27,612. (No model.)

*To all whom it may concern:*

Be it known that I, BENJAMIN F. D. MILLER, a citizen of the United States, residing at Wooster, in the county of Wayne and State of Ohio, have invented new and useful Improvements in Oil Tanks and Pumps, of which the following is a specification.

My invention relates to oil tanks and pumps designed for use by retail dealers in oil; and the objects of the same are to provide a simple and convenient apparatus for dispensing oil in small quantities and to provide means whereby only the exact amount required may be placed within the delivery-tank and delivered to the customer.

Another object is to provide a self-measuring tank with an indicator and a scale which may be set to indicate the quantity of oil desired to be pumped into the delivery-tank and the price of the same to the customer, the arrangement of characters and figures on the scale being such that the price and quantity of oil may be indicated by the same pointer at whatever the quoted price of oil may be.

I attain these objects by means of the construction shown in the accompanying drawings, in which—

Figure 1 is a side elevation and partial section of an apparatus made in accordance with my invention. Fig. 2 is an enlarged view of the scale and pointer.

In said drawings, 1 is a reservoir for containing oil and may be an ordinary barrel, cask, or tank of any suitable description and capacity. This reservoir may be located in the cellar of the store or in any convenient place and may be connected to my self-measuring tank 2 by means of hose or piping. As shown in the drawings, the self-measuring tank 2 is supported upon suitable legs 3, bolted to the floor, and at the side of the tank a pump 4 is suitably secured, the delivery-nozzle 5 of said pump being located above the open upper end of the tank 2. A pipe or hose 6 is connected to the lower end of the pump-casing and extends down into the reservoir 1. The tank 2 may be of any desirable capacity; but the size most suitable for my purpose will hold about three gallons. An overflow-pipe 7 extends up through the bottom of the tank 2, and a packing-ring 8 is fitted to the tank-bottom to form a liquid-tight connection between the pipe 7 and the tank and to permit the pipe 7 a sliding vertical movement therein. Other means of making a sliding liquid-tight connection may be resorted to without departing from the spirit of my invention, as by a ground-joint or a nicely-fitted connection. This overflow-pipe is of a length substantially equal to the height of tank 2, and at its lower end a hose or other pipe 9 is connected and extends down into the reservoir 1. A rod 10, having at its upper end a double pointer 11, is connected at its lower end to the pipe 7 by means of a clamp 12. The clamp 12 surrounds the pipe 7, and the pointer-rod 10 is secured to the outer end of said clamp. The pointer 11 extends horizontally at the upper end of the rod 10 in the same horizontal plane as the open upper end of the overflow-pipe 7. A glass gage-tube 13 communicates at its lower end with the interior of the tank 2, near the bottom thereof, and forms a visual indicator for the height of the oil in said tank at all times. A scale 14 is secured to the side of the tank 2, and the characters and numerals on this scale designate the price of the oil contained within the tank at the point at which the pointer 11 is set. To illustrate: If oil is to be sold at twelve cents per gallon and the purchaser calls for a half-gallon, the pointer 11 is set at "6" on the scale 14, as shown in Fig. 2, the numeral "6" then indicating the amount of money to be paid for the half-gallon of oil. The pump 4 is then operated and the oil is pumped into the self-measuring tank 2. If more than the right quantity is pumped in the tank 2, it runs back through the overflow pipe 7 to the reservoir 1 until just the required amount represented by the height of the pointer 11 remains in the tank 2. The oil is then delivered to the purchaser through the faucet 15.

It will be understood that the open upper end of the overflow-pipe 7 is always at the same height as the pointer 11, and as the pointer-rod 10 is connected to the overflow-pipe any adjustment of the pointer will correspondingly adjust the height of the upper end of the overflow-pipe.

The scale 14 has a number of vertical columns, containing numerals from "5" to "12,"

inclusive. These numerals represent the different rates per gallon for oil. The numerals "1" to "11" in the column 12 designate the values of oil in cents from one cent's worth to twelve cents' worth, and the pointer may be set to give just the required amount for the money. The other vertical columns headed by the numerals "5," "6," "7," &c., have figures at different points in the columns to designate the price in cents for the quantity of oil represented by the horizontal lines at the price per gallon indicated by the headings.

Having thus fully described my invention, what I claim is—

1. In a liquid-measuring device, the combination, substantially as described, with a reservoir for containing liquid, of a measuring-tank, a pump arranged to raise oil from said reservoir into said tank, an overflow-pipe constructed to slide through the bottom of said measuring-tank, a pointer or indicator connected to move in unison with said discharge-pipe and situated in the same horizontal plane with the top thereof, and an indicator-scale mounted on said measuring-tank and constructed to designate the position of said pointer.

2. In a liquid-measuring device, the combination, substantially as described, of a measuring-tank, an overflow-pipe mounted liquid-tight to slide in an aperture in the bottom of said measuring-tank, a pointer or indicator connected to move in unison with said discharge-pipe and situated in the same horizontal plane with the top thereof, and an indicator-scale mounted adjacent to said pointer and constructed to designate the position or height of said pointer and the price of the oil to be drawn out.

In testimony whereof I have hereunto set my hand in presence of two subscribing witnesses.

BENJAMIN F. D. MILLER.

Witnesses:
LYMAN CRITCHFIELD, Jr.,
SERAFINO ZARLENGO.